(12) United States Patent
Grintz

(10) Patent No.: US 6,183,203 B1
(45) Date of Patent: Feb. 6, 2001

(54) MOUNT FOR FAN

(75) Inventor: J. Todd Grintz, Downingtown, PA (US)

(73) Assignee: Lasko Holdings, Inc., West Chester, PA (US)

( * ) Notice: Under 35 U.S.C. 154(b), the term of this patent shall be extended for 0 days.

(21) Appl. No.: 09/186,553

(22) Filed: Nov. 5, 1998

(51) Int. Cl.[7] ................................................ F04D 29/60
(52) U.S. Cl. ...................................... 416/246; 416/247 R
(58) Field of Search ............................... 416/246, 247 R, 416/244 R; 248/309.1, 289.11

(56) References Cited

U.S. PATENT DOCUMENTS

| 4,319,314 | * | 3/1982 | Morton | 368/432 |
| 4,973,016 | * | 11/1990 | Hertenstein | 248/282 |

* cited by examiner

Primary Examiner—Edward K. Look
Assistant Examiner—Richard Woo
(74) Attorney, Agent, or Firm—Zachary T. Wobensmith, III

(57) ABSTRACT

A mount for a fan which is suitable to mount the fan to a wall, or a ceiling, or any flat surface, which includes a bracket to attach to the surface, which has a tubular member attached thereto and to the fan body, to suspend the fan body, which permits the fan to rotate or pivot for air direction.

3 Claims, 5 Drawing Sheets

MOUNT FOR FAN

BACKGROUND OF THE INVENTION

1. Field of the Invention

This invention relates to a mount for a fan, of the type that has a bracket attached to a flat surface which suspends the fan body, and provides fan body rotation and pivoting to vary the air direction.

2. Description of the Prior Art

In many applications a high velocity fan is desired that may be semi-permanently mounted in an area, which does not have a horizontal surface on which to place the fan, or where it is desirable to have the fan suspended at a raised location from the floor.

Heretofore, efforts at providing a fan that can be mounted on the wall or a ceiling have been directed to using a flat strap like construction that does not adequately support the fan body, which body can be heavy and awkward to move, and which construction does not provide the desired maneuverability of the fan for varying air direction.

The mount of the invention attaches to any flat surface, provides adequate support for the fan body, is capable of pivoting or rotating the fan body to change the air flow direction, and provides other benefits.

SUMMARY OF THE INVENTION

A mount for fans that has a bracket for attachment to a flat surface, with a tubular member extending therefrom which is attached to a fan body, and permits rotation and pivotal movement of the fan body for varying the direction of air flow.

The principal object of the invention is to provide a mount for fans that can be attached to any flat surface, and which suspends the fan body.

A further object of the invention is to provide a mount for fans which includes a bracket for attachment to a flat surface, with a tubular member attached to the bracket and to the fan body.

A further object of the invention is to provide a mount for fans that is simple to construct and durable in use.

A further object of the invention is to provide a mount for fans that permits both pivotal and rotational movement of the fan body.

A further object of the invention is to provide a mount for fans that is easy to use.

Other objects and advantageous features of the invention will be apparent from the description and claims.

DESCRIPTION OF THE DRAWINGS

The nature and characteristic features of the invention will be more readily understood from the following description taken in connection with the attached drawings forming part hereof in which.

It should, of course, be understood that the description and drawings herein are merely illustrative and that various modifications and changes can be made in the structure disclosed without departing from the spirit of the intention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Figure 1:
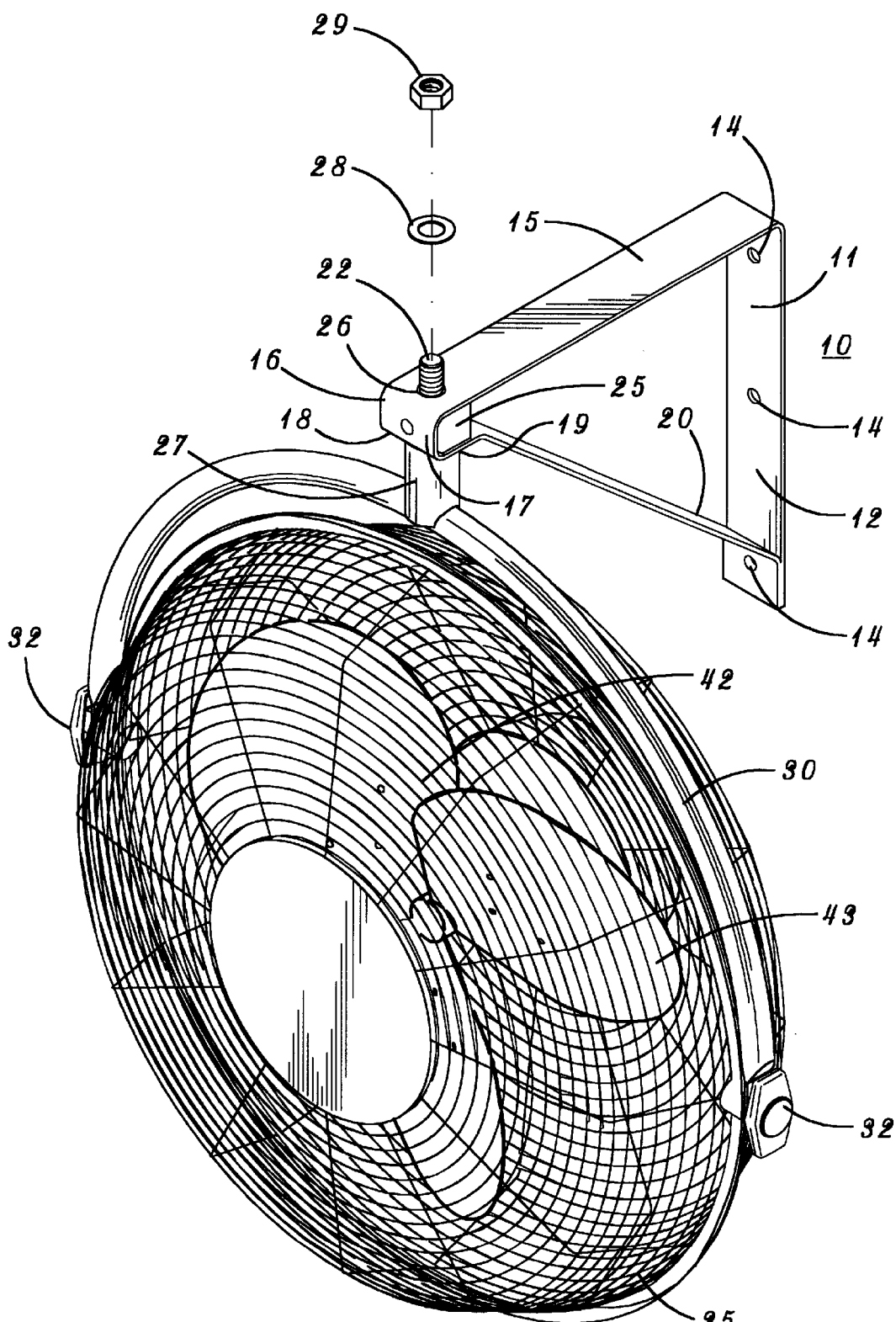
FIG. 1 is a view in perspective of a fan mount and fan in accordance with the invention.
Figure 2:
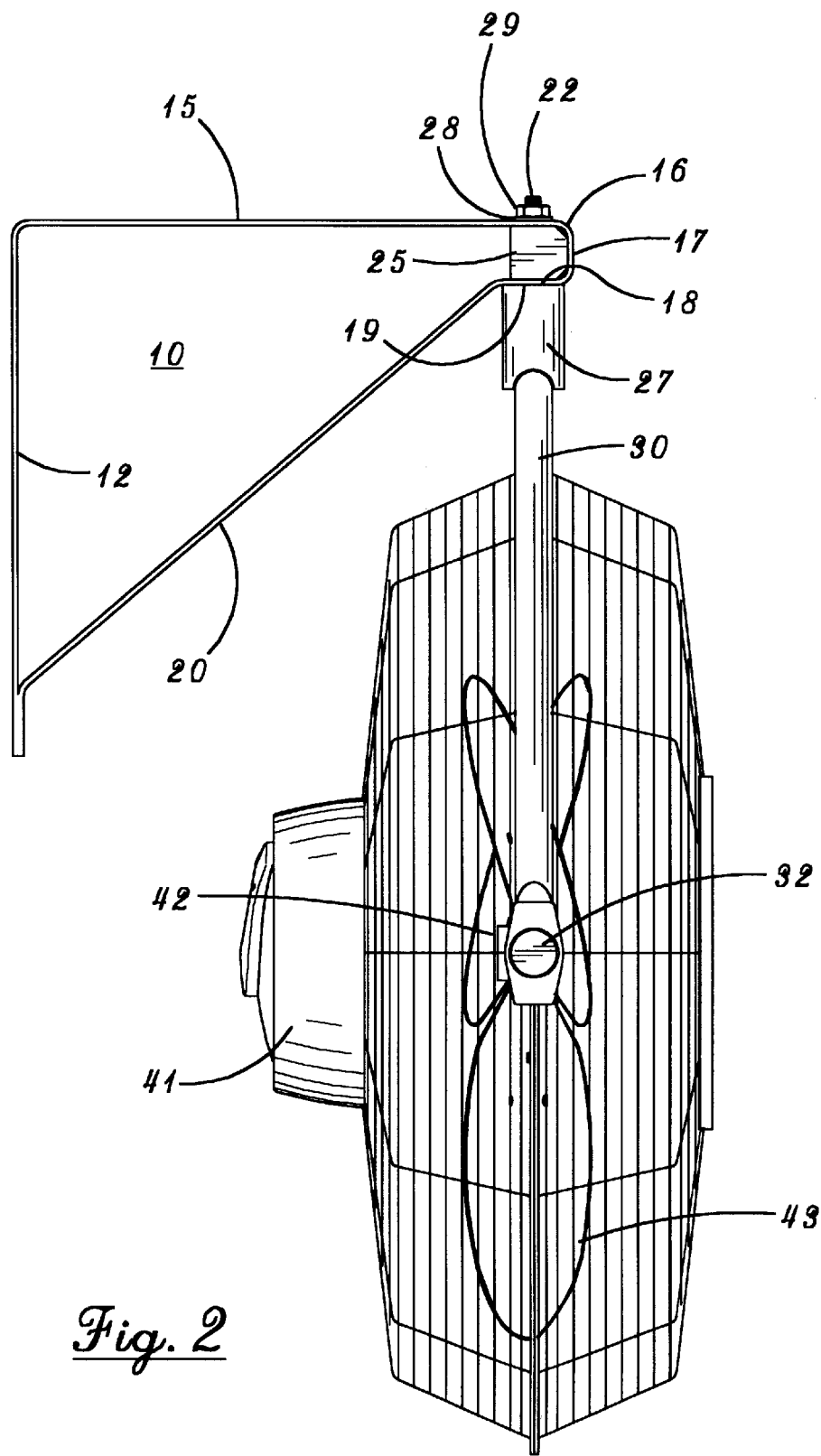
FIG. 2 is a side elevational view of the structure of FIG. 1.
Figure 3:
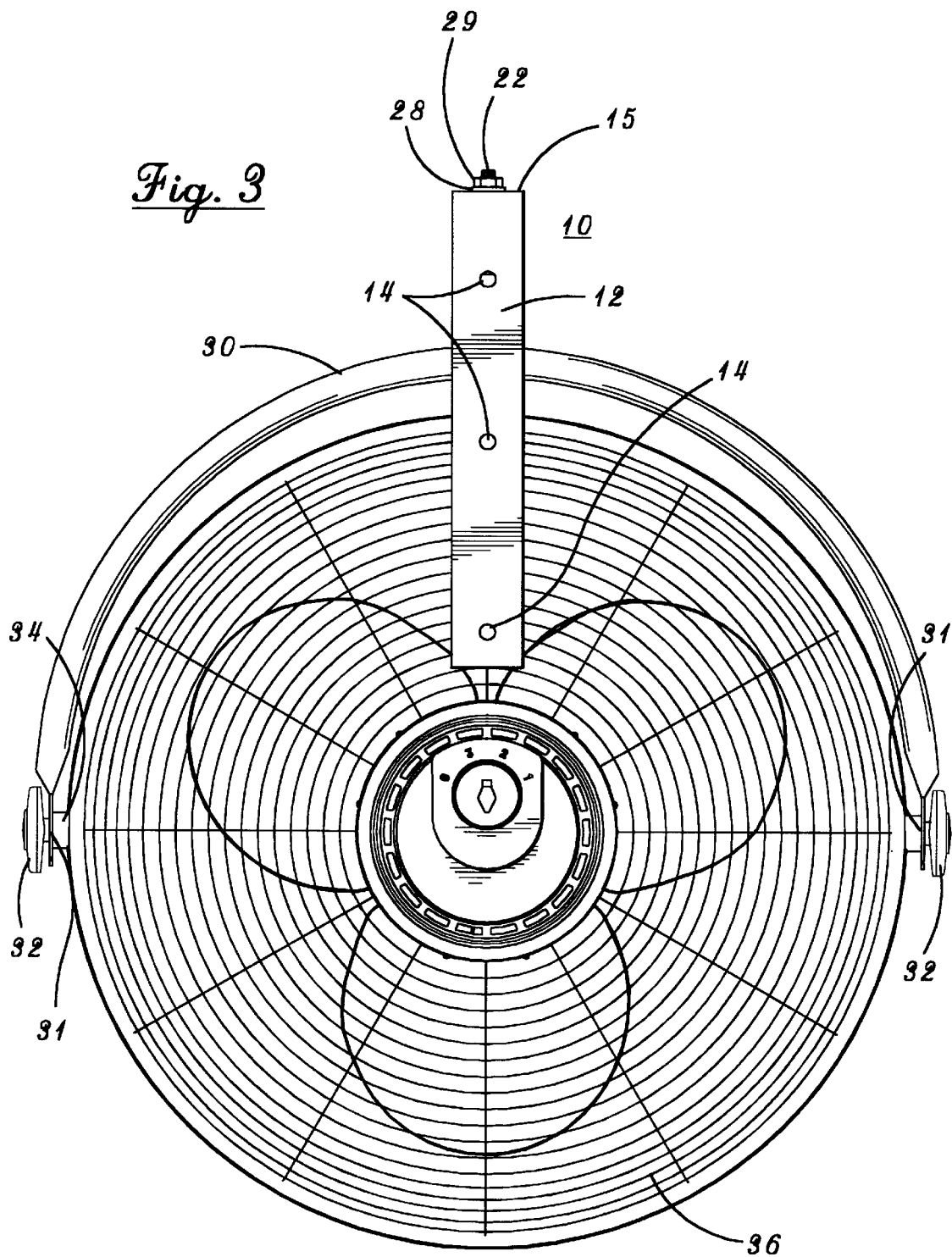
FIG. 3 is a rear view of the structure of FIG. 1.
Figure 4:
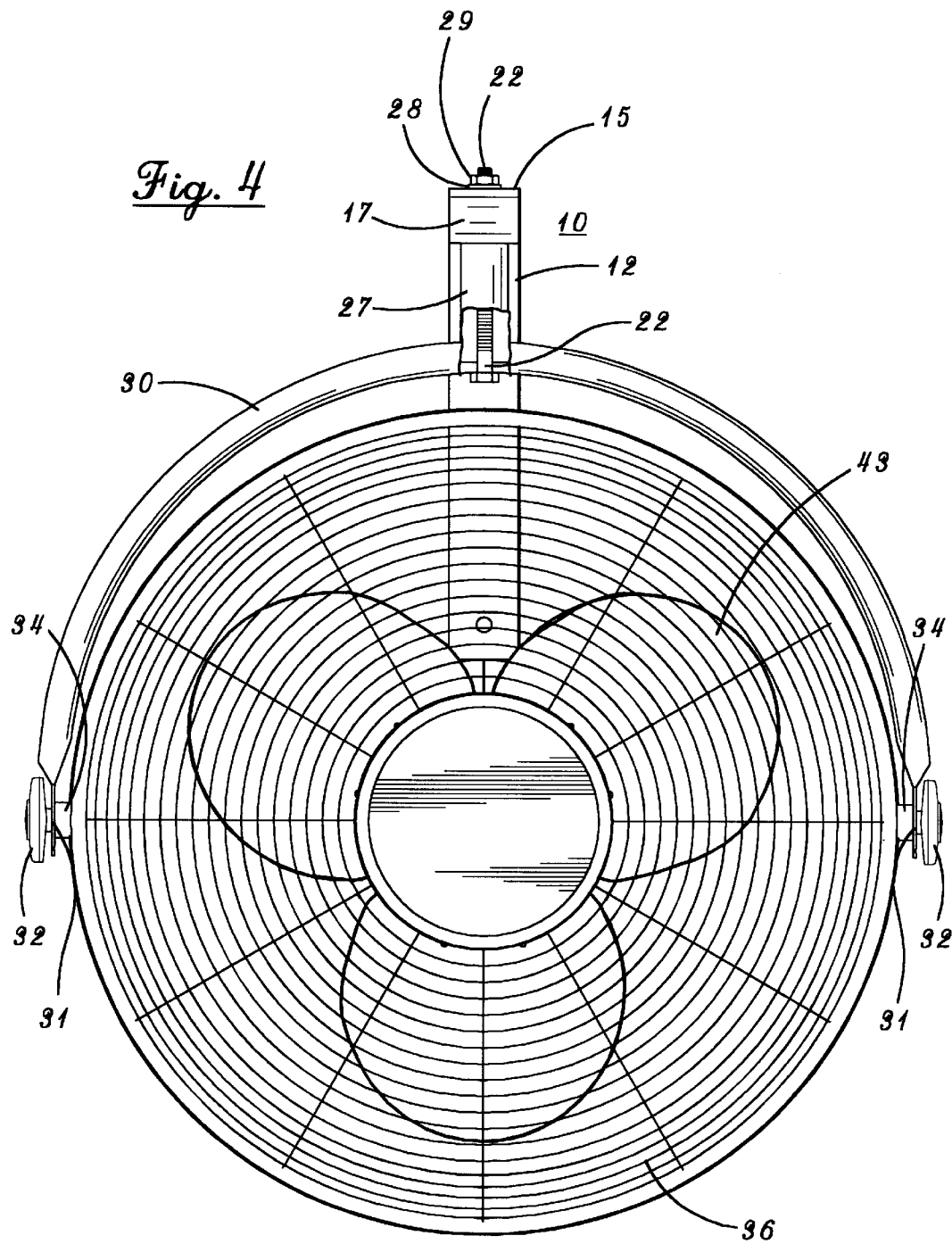
FIG. 4 is a front view of the structure of FIG. 1.
Figure 5:
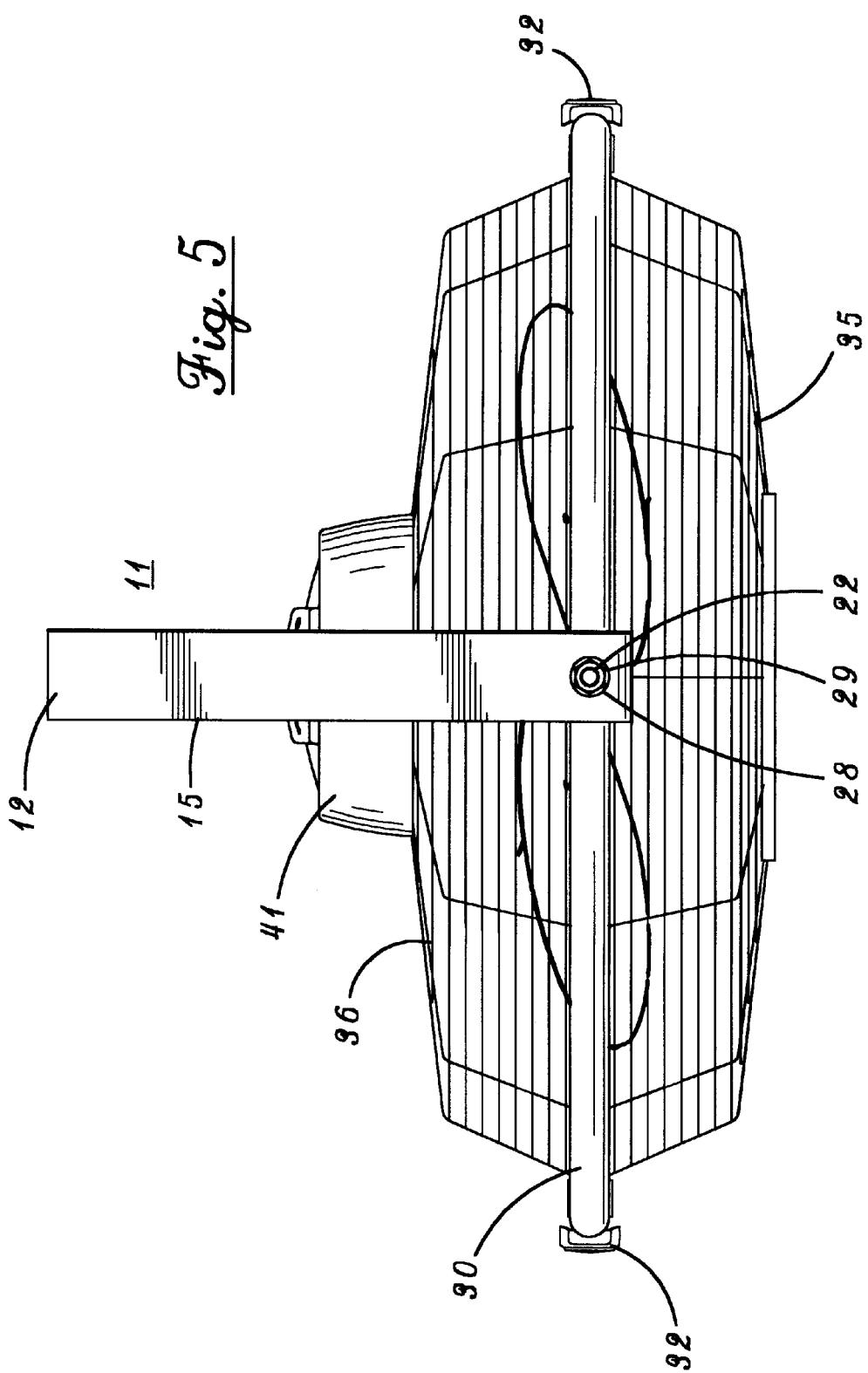
FIG. 5 is a top view of the structure of FIG. 1.

Referring now more particularly to FIGS. 1–5 of the drawings the fan mount 10 of the invention is therein illustrated.

The fan mount 10 includes a bracket 11 of triangular configuration, with a vertical rear wall 12, which has a plurality of openings 14, (three being illustrated) through which screws or lag bolts (not shown) may be inserted to attach wall 12 to a flat surface, (not shown) such as a wall or ceiling (not shown). The bracket 11 has a horizontal top wall 15 attached to and integral with rear wall 12, with a front curved wall 16 integral with top wall 15, a straight front wall 17 integral with wall 16, a bottom curved wall 18 integral with wall 17 and a flat bottom wall 19 integral with wall 18.

A connecting wall 20 is integral with wall 19, and extends down and back to rear wall 12 to which it is joined.

The bracket 11 is preferably formed of stamped sheet metal.

A mounting block 25, preferably of metal, is provided, between walls 15, 16, 17, 18 and 19, which is fastened thereto by any suitable means such as welding.

A bolt 22 is provided, which extends up through spacer 27 and mounting block 25, through an opening 26 in top wall 15, through a washer 28, and is engaged with a nut 29.

The spacer 27 is fastened to a mounting yoke 30, of half circle configuration, which is preferably formed of metal tubing.

The yoke 30 is flat at each end 31, with an opening (not shown) therethrough, with a thumbscrew 32 extending therethrough, and engaged in a spacer 34 which has internal threads (not shown), and is fastened in well known manner to the front and rear grills 35 and 36 of a fan body 40.

The rear grill 36 has an electric fan motor assembly 41 attached thereto in conventional well known manner, with a fan hub 42 extending therefrom with fan blades 43 (three being shown) thereon.

The motor assembly 41 includes a pull chain switch (not shown) to operate the fan motor (not shown).

A cordset (not shown) is provided connected to the motor mount switch (not shown) to the motor (not shown) and to a source of electrical power (not shown).

In use, the bracket 11 is mounted to the desired surface (not shown) by bolts or lag screws (not shown). The thumbscrews 32 ar loosened and the fan body 40 positioned in yoke 30, and rotate about mounting block 25 to the desired position, the thumbscrews 3 and bolt 22 are tightened, with fan body 40 located as desired and the fan motor (not shown) activated.

The fan body 40 can be repositioned as required and the bracket mounted to any desired flat surface, and which bracket can be easily removed and remounted to another surface as required.

It will thus be seen that structure has been provided with which the objects of the invention are attained.

I claim:

1. A fan mount for mounting a fan to a flat surface which includes a bracket for attachment to said flat surface, said bracket is of triangular configuration with a rear wall, a top wall and a connecting wall, front wall means connecting said top wall and said connecting wall, a mounting block carried in said front wall means, bolt means engaged with said mounting block, spacer means engaged with said bolt means, and rotatable about said mounting block, yoke means attached to said spacer means, said fan having a fan body, connecting means for connecting said yoke means to said fan body and for controlled rotation of said fan body in said yoke means.

2. A fan mount as defined in claim 1 in which said yoke means includes a half circle length of metal tubing, said yoke means has flat ends, and said connecting means including thumbscrews engaged with said yoke ends and with spacers engaged with said fan body.

3. A fan mount as defined in claim 1 in which said bracket is of stamped sheet metal.

* * * * *